United States Patent [19]
Phillipson

[11] Patent Number: 4,601,383
[45] Date of Patent: Jul. 22, 1986

[54] HANDLING OF BISCUITS OR LIKE LAMINAR ARTICLES

[75] Inventor: John G. Phillipson, Peterborough, United Kingdom

[73] Assignee: Baker Perkins Holdings PLC, United Kingdom

[21] Appl. No.: 556,691

[22] Filed: Nov. 30, 1983

[30] Foreign Application Priority Data

Dec. 11, 1982 [GB] United Kingdom ............... 82 35392

[51] Int. Cl.⁴ ............................................. B65G 47/68
[52] U.S. Cl. ................................... 198/448; 198/463.4
[58] Field of Search ............... 198/448, 452, 442, 369, 198/491, 865, 587, 594, 436, 445, 535, 536, 602, 609, 861.6

[56] References Cited

U.S. PATENT DOCUMENTS

| | | | |
|---|---|---|---|
| 1,370,695 | 3/1921 | Lile | 198/369 X |
| 1,462,078 | 7/1923 | Williams et al. | 198/865 X |
| 2,889,077 | 6/1959 | Cunningham | 198/504 X |
| 3,193,078 | 7/1965 | Amenta et al. | 198/442 X |
| 3,499,522 | 3/1970 | Novak | 198/594 X |
| 3,580,141 | 5/1971 | Richter | 198/448 X |
| 4,265,356 | 5/1981 | Glover | 198/452 X |

FOREIGN PATENT DOCUMENTS

| | | | |
|---|---|---|---|
| 69117 | 5/1941 | Switzerland | 198/369 |
| 202765 | 12/1967 | U.S.S.R. | 198/448 |

Primary Examiner—Joseph E. Valenza
Assistant Examiner—Michael Stone
Attorney, Agent, or Firm—Steele, Gould & Fried

[57] ABSTRACT

Apparatus for handling biscuits, (or like laminar articles), comprises a plurality of article delivery channels, a reduced number of article receiving channels, and article transfer troughs disposed between the delivery and receiving channels, the transfer troughs being operable to select batches of articles from the delivery channels and to transport the batches to the receiving channels, whereby the overall number of streams of articles is reduced. The article transfer troughs are pivotally movable about substantially vertical axes, whereby one end of a transfer trough may be aligned with the outlet of one of three delivery channels, while the other end of the trough remains in general alignment with the inlet of a receiving channel.

7 Claims, 4 Drawing Figures

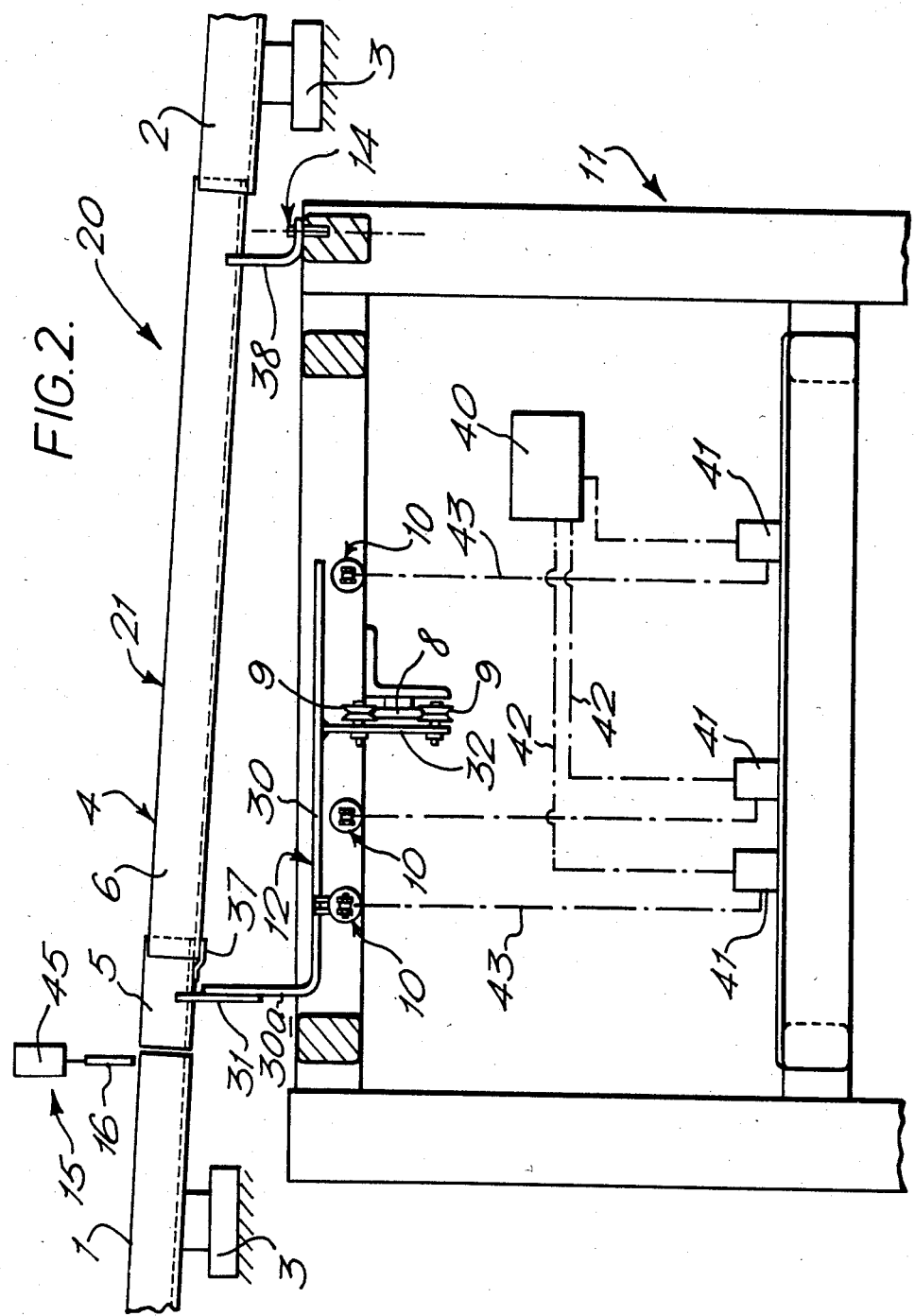

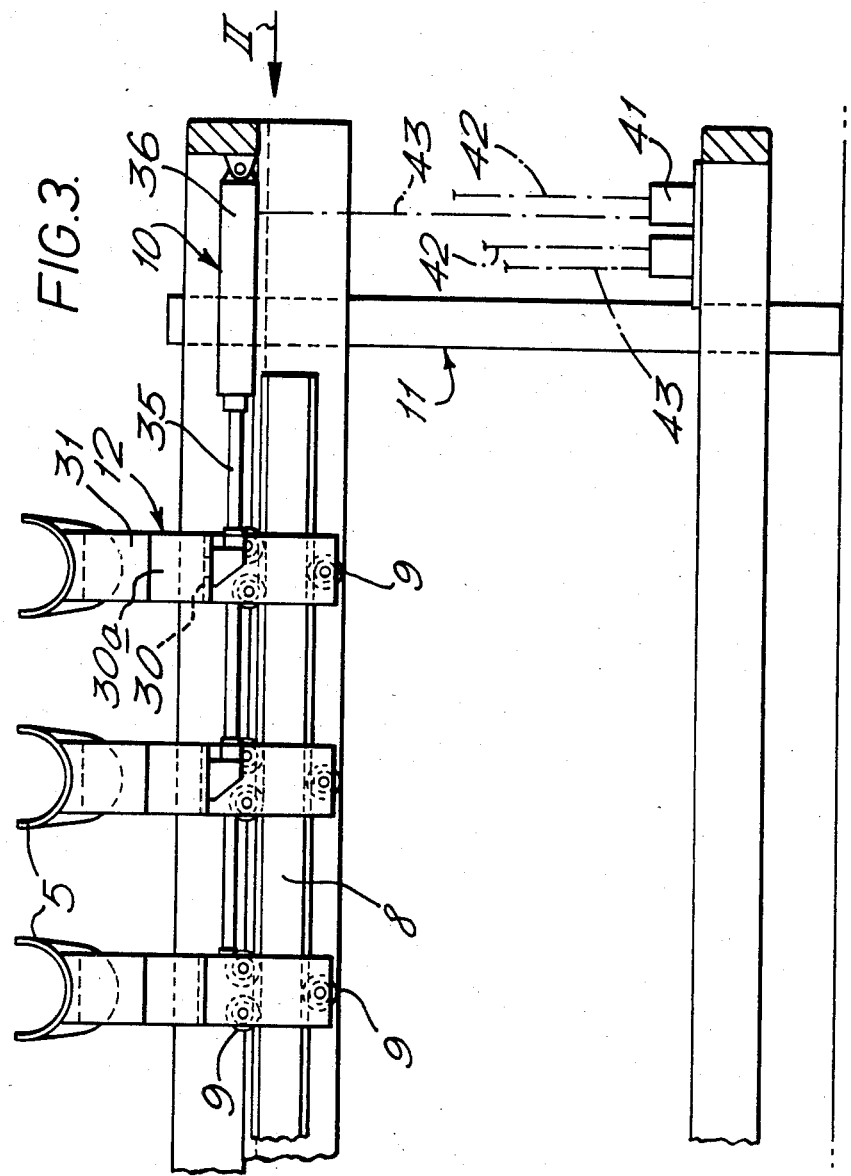

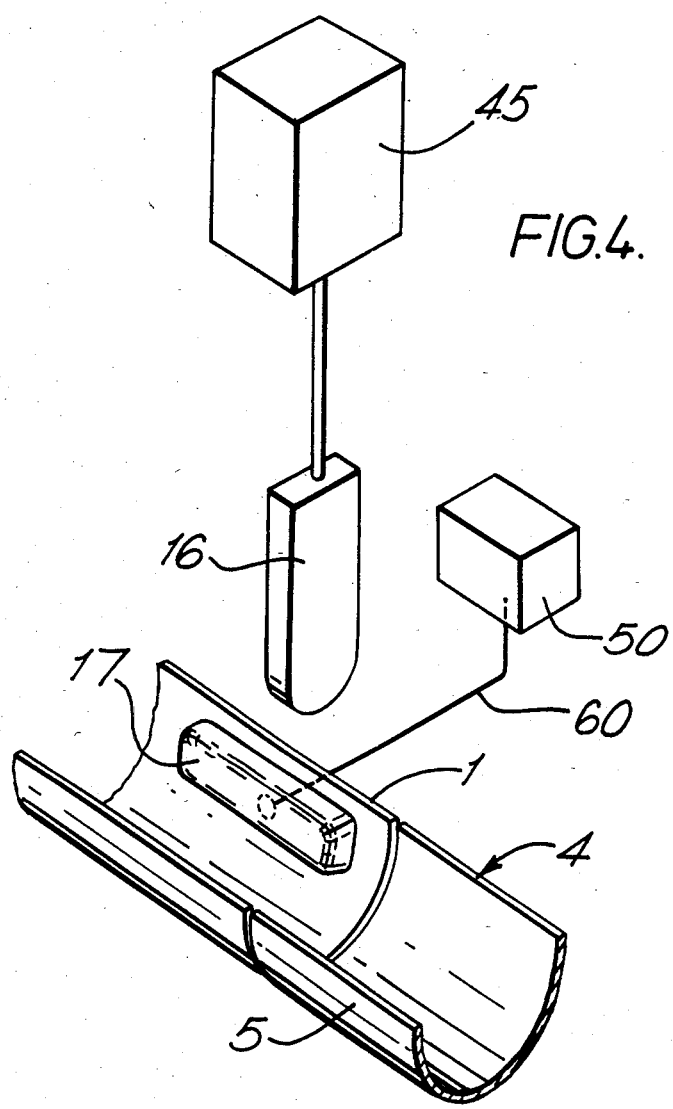

HANDLING OF BISCUITS OR LIKE LAMINAR ARTICLES

BACKGROUND TO THE INVENTION

This invention relates to the handling of biscuits or like laminar articles (hereinafter "articles") and more particularly relates to apparatus enabling a plurality of streams of articles to be reduced to a lesser number of streams.

The invention is particularly suitable to the well-known type of biscuit manufacturing plant wherein, after being baked in an oven, the biscuits emerge from the oven lying flat on a band conveyor, in rows or lanes disposed side by side across the width of the conveyor, as well as spaced apart from each other in a direction lengthwise thereof. The biscuits, prior to being fed to subsequent handling equipment such as creaming and-/or wrapping machines, are converted from a position in which they are lying flat on the conveyor band, to a stacked position in which they rest on edge, in face to face contact, so as to form aligned columns or streams. In this position they are conveyed in rows within guide channels extending in the direction of conveyance.

Use of the full width of the oven band is necessary to achieve correct baking results. However, the number of rows of biscuits emerging from the oven is usually substantially greater than the number required to feed subsequent handling apparatus. Furthermore, the number of biscuits across the band is often unsuitable for subsequent handling. The number of rows, therefore, needs to be reduced to a number suitable for subsequent feeding to processing apparatus such as creaming and wrapping machines.

The object of the present invention is to provide apparatus which can handle a plurality of streams of laminar articles such as biscuits, so as to form a lesser number of streams.

SUMMARY OF THE INVENTION

According to the present invention, apparatus for handling biscuits or like laminar articles comprises a plurality of article delivery channels, a reduced number of article receiving channels, and article transfer means disposed between the delivery and receiving channels, said means being operable to select batches of articles from the delivery channels in a predetermined manner and to transport the batches to the receiving channels, whereby the overall number of streams of articles is reduced.

The transfer means may comprise a plurality of transfer troughs, one for each article receiving channel, the transfer troughs being movable between the delivery channels whereby one end of a transfer trough may be aligned with the outlet of a delivery channel, the other end of the transfer trough remaining in general alignment with the inlet of a receiving channel. Each transfer trough may be pivotally mounted adjacent a receiving channel so as to be movable relative thereto. Stop means may be provided which are operable to periodically arrest the flow of articles leaving a particular delivery channel, whereby a transfer trough may be moved out of alignment therewith.

BRIEF DESCRIPTION OF THE DRAWINGS

An embodiment of the invention will now be described, by way of example only, with reference to the accompanying drawings, wherein:

FIG. 2 is a fragmentary side view, with parts removed, of a portion of the apparatus, looking in the direction of arrow II of FIG. 3, FIG. 3 is a fragmentary front end view, with parts removed, looking in the direction of arrow III of FIG. 1, and FIG. 4 is a view in perspective of a detail, to an enlarged scale.

DETAILED DESCRIPTION OF THE PREFERRED EMBODIMENT

Figure 1:
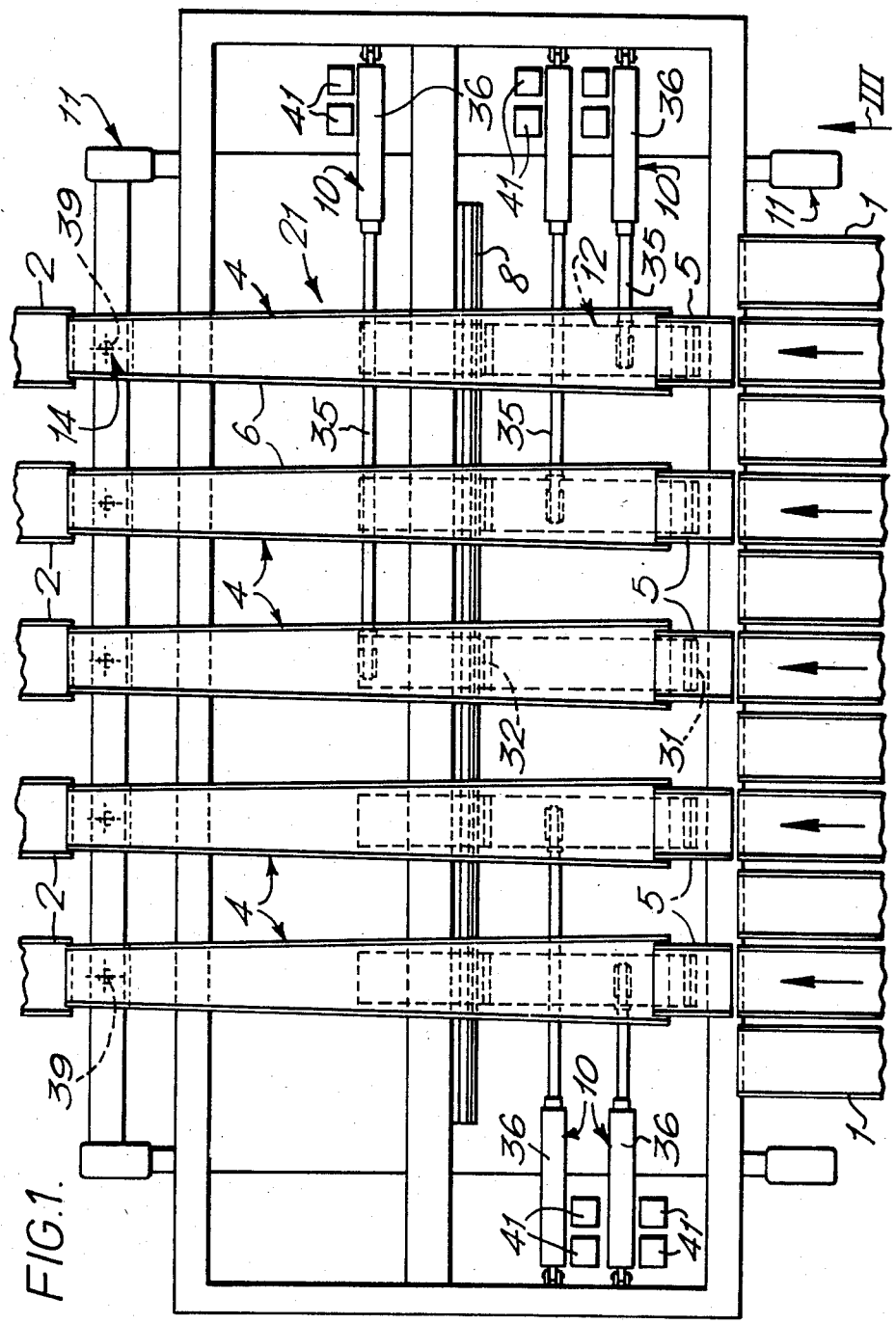
FIG. 1 is a fragmentary plan view of apparatus for handling biscuits.

With reference to FIGS. 1, 2 and 3, apparatus 20 for handling biscuits, (or like laminar articles), comprises a plurality (eleven) of article delivery channels 1, a reduced number (five) of article receiving channels 2, and article transfer means 21 disposed between the delivery and receiving channels, the transfer means 21 being operable to select batches of articles from the delivery channels 1 and to transport the batches to the receiving channels 2, whereby the overall number of streams of articles is reduced. (From eleven to five).

As shown in FIG. 2, the delivery and receiving channels 1, 2 respectively are mounted on vibratory units 3, whereby the channels are vibrated so as to provide the motive power for conveying the biscuits along the channels.

To assist vibration-induced movement of the biscuits, the delivery channels 1, and the receiving channels 2 incline downwardly at about 3° (in this example) to the horizontal. The amount of downward inclination may vary from apparatus to apparatus, according to operating requirements.

The amplitude and/or frequency of vibration S1 of the delivery channels 1 is determined by the speed of biscuit supply thereto, while the amplitude and/or frequency of vibration S2 of the sections of channels 1 immediately prior to the associated transfer means 21 and of the subsequent vibrated channels 2, is greater than S1 by the ratio of lane or stream reduction, plus a fraction for conveying time lost during movement of transfer means 21. Thus the eleven stream input of biscuits is balanced with the five stream output thereof.

The apparatus 20 forms part of a biscuit manufacturing plant which includes an oven and a band conveyor for carrying biscuits from the oven to the apparatus. The biscuits are of circular plan form. The channels 1, 2 are of part-circular lateral cross-section so as to accommodate the circular biscuits.

As shown in FIG. 1, the article transfer means 21 comprise five article transfer troughs 4, each formed by aligned and interfitting first and second sections 5, 6. First section 5 is relatively short. Second section 6 is relatively long. The transfer troughs 4 are movable between the delivery channels 1 whereby one end of a transfer trough may be aligned with, or presented to, the outlet of a delivery channel 1, while the other end of the trough remains in general alignment with the inlet of a receiving channel 2.

Referring now to FIG. 2, the first sections 5 of the transfer troughs 4 are supported by carriages 12 mounted on assemblies comprising a fixed slide 8 and rollers 9 movable thereon. Each carriage 12 comprises a base 30 of elongated form, when viewed in plan, one end of which is turned up to form a flange portion 30a. A plate 31 with a part-circular cut-away (to accommodate the part-circular section 5) is secured to the flange portion 30a whereby the section 5 is supported. The base 30 is itself supported by a plate 32 extending downwardly from the under-surface of the base 30, (to which it is attached), to the rollers 9, (to which it is also attached). The arrangement constrains movement of the section 5 to paths disposed substantially normal to the longitudinal axes of the sections 5, (and of the delivery channels 1). Five individual fluid piston/cylinder assemblies 10 provide actuating means which are used to displace the sections 5, and thus the transfer troughs 4. A piston of an assembly 10, which piston is double-acting, is connected by way of its piston rod 35 to the carriage 12 of the associated first section 5. The stationary cylinder 36 of the assembly 10 is mounted on a base-support frame 11 which also supports the slide/-roller assemblies 8 and 9. The working fluid of the assemblies 10 is pressurised air.

As shown in FIG. 1, the end of each of the first sections 5 remote from the delivery channels 1, is fitted within the adjacent end of associated second section 6 with a little side clearance. The arrangement allows relative movement between the connected ends of the sections 5, 6. The weight of the section 6 is taken by a strip 37 secured to the bottom of the section 5 and extending under the adjacent end of the section 6. The other end of the section 6 is movably supported by a pivot assembly 14 carried by the frame 11, at a point adjacent the front or inlet end of associated receiving channel 2. The other end of section 6 extends (with side clearance) into the receiving channel 2 whereby biscuits are transported from the section 6 to the channel 2.

The pivot assembly 14 comprises an "L"-shaped support plate 38, the upright limb of which has a cut-away portion to receive the section 6, and movable about a substantially vertical axis 39.

The piston/cylinder assemblies 10 are used to displace the five movable transfer troughs 4 according to a pre-set program dictated by a controller 40 which operates individual control valves 41 by way of signal lines 42. Each assembly 10 is provided with a pair of control valves 41. Two control valves per assembly 10 are necessary as an assembly uses a double-acting piston, as mentioned above. The control valves 41 operate the individual piston/cylinder assemblies 10 by way of pressurised air lines 43.

As illustrated in FIGS. 2 and 4, above the outlet end of each of the article delivery channels 1, stop means 15 are provided which are operable so as to periodically arrest the flow of biscuits within the channels 1, and to release the flow when transfer of biscuits is to take place. The stop means 15 need not be described or illustrated in detail, as they are well known, being disclosed, for example, by U.K. Pat. No. 912,449 (U.S. Pat. No. 3,127,029 and Swiss Patent Application No. 13507, filed Dec. 2nd, 1960, correspond). Briefly, the stop means 15 comprise a displaceable separating member in the form of a finger 16 which is movable downwards from above a delivery channel 1 into the row of biscuits therein, so as to arrest the flow. Thus biscuits are prevented from leaving a particular delivery channel 1 while a transfer trough 4 is moved out of alignment therewith. The trough 4 can then be aligned with another delivery channel 1, and the finger 16 of the associated stop means 15, which was holding back the flow of biscuits from the channel is lifted so as to allow the biscuits to pass to the trough 4. In the present disclosure, a suitable control and operating system for fingers 16 is indicated by reference 45 in FIG. 4.

In order to assist entry of a stop finger 16 into a row of biscuits, expansible clamping means are provided, operable so as to apply a lateral force on biscuits within a delivery channel 1.

The clamping means comprise an inflatable bladder 17 (FIG. 4) which, when inflated, grips a batch of biscuits within a delivery channel 1, so as to reduce the line pressure on the biscuit row.

The bladders 17 are each disposed on the inner surface of a delivery channel 1, as shown in FIG. 4.

U.K. Pat. No. 1,356,384 describes and illustrates biscuit handling apparatus using inflatable bladders. The teachings of this prior art reference may readily be adopted to provide control and operation of the bladder 17. In the present disclosure, a suitable bladder control and operating system is indicated by reference 50.

As will be apparent from FIG. 4, when biscuits are being conveyed (with bladder 17 deflated) along a delivery channel 1, the biscuits are allowed to pass from the channel 1, over to the trough 4 aligned therewith. When the bladder 17 is inflated, due to operation of its control system 50, using inflation/deflation line 60, the bladder grips the sides of the stacked biscuits in the delivery channel 1. Thus line pressure on biscuits flowing along the delivery channel 1 is removed, enabling the finger 16 to more easily make entry into the biscuit stream by insertion between a pair of adjacent biscuits.

As a further way of assisting entry of a stop finger 16 into a flow of biscuits, control means (not shown) are provided whereby one or more of the vibratory units 3 associated with the outlet sections of the delivery channels 1 is rendered inoperative for a brief period of time. This action removes the motive vibration momentarily so as to reduce line pressure on the biscuits.

In operation, biscuits are conveyed from a position in which they are lying flat on the conveyor band transporting them from the oven, to a stacked position in which they rest on edge, in face to face contact, so as to form aligned columns or streams. The streams are then directed into the delivery channels 1.

After a predetermined period of time, wherein biscuits are conveyed from a delivery channel 1 to one of the movable transfer troughs 4 of the transfer means 21, the associated finger 16 is operated by its system 45 so as to cut off the supply of biscuits from that particular channel. The associated assembly 10 is then used to displace the section 5 of the transfer trough 4 whereby it is aligned with the outlet of the delivery channel 1. This displacement also causes the interfitting section 6 to swivel about the axis 39 of its pivotable mounting 14. The finger 16 of the channel 4 is lifted, and biscuits are again fed to the transfer trough. Movement of the transfer trough 4 is facilitated quickly by means of the piston and cylinder assemblies 10.

Use of double-acting piston and cylinder assemblies 10 results in each of the transfer troughs 4 being alignable with the outlets of any one of three article delivery channels 1. For example, a central channel 1 and one on each of its sides. According to a program provided, the sequence of "visits" by each transfer trough 4 to delivery channels 1, is arranged whereby the input to the transfer means 21 can be balanced against output requirements of the system, and the reduction of eleven lanes to five achieved.

The program also dictates how long a transfer trough 4 remains aligned with a delivery channel 1, and thus how many biscuits are transferred to a receiving channel 2.

Operation of stop fingers 16 and bladders 17 is also controlled by this program.

The program is self-adjusting, so as to ensure that if a lane is starved of biscuits, the condition, which is sensed by photoelectric means (not shown), can be altered automatically. The alteration is made by the controller 40, whereby the number of biscuits taken from the delivery channel 1 of the starved lane is reduced, until the original condition has been restored. For instance, the reduction of eleven lanes to five may be changed to 10:5, leaving out the starved lane until the original conditions are re-established, whereupon the program changes back to the 11:5 reduction by inclusion, once again, of the previously starved lane.

I claim:

1. Apparatus for handling biscuits and like fragile, laminar articles stacked in an on-edge formation of article strings, comprising:
   a plurality of article delivery channels, each having an outlet;
   a reduced number of article receiving channels, each having an inlet; and,
   article transfer means disposed between the delivery and receiving channels, and operable to receive batches of articles from selected delivery channels in a predetermined manner and transport selected batches to the receiving channels, whereby the overall number of strings of articles is reduced, said transfer means comprising:
      a transfer trough for each article receiving channel, each transfer trough being formed by a relatively long section having one end mounted for swivel movement within a receiving channel inlet and a relatively short section having one end alignable with at least two delivery channel outlets;
      means smoothly interfitting the remaining ends of each section with the other while allowing relative movement between the interfitted ends; and,
      means operable to displace the relatively short section between delivery channel outlets,
         the delivery channels, the troughs and the receiving channels remaining in general alignment and forming a substantially continuous and unobstructed transfer path not withstanding the relative movements thereof, whereby the fragile articles may be handled without damage.

2. Apparatus as claim 1, further comprising stop means operable within a delivery channel so as to periodically arrest the flow of articles leaving a particular delivery channel, whereby a transfer trough may be moved out of alignment therewith.

3. Apparatus as claimed in claim 2, wherein the stop means comprises a displaceable separating member insertable between adjacent articles.

4. Apparatus as claimed in claim 2, wherein the stop means comprises a displaceable separating member insertable between adjacent articles and, expansible clamping means operable to apply a lateral force on articles within a delivery channel.

5. Apparatus as claimed in claim 1, further comprising means for applying vibration forces to the article delivery and receiving channels so as to induce movement of the articles along said channels.

6. Apparatus as claimed in claim 1, wherein the short sections define longitudinal axes and the displacing means are operable to move the short sections substantially normally to the longitudinal axes.

7. Apparatus as claimed in claim 1, wherein the displacing means are operable to move the short sections along substantially linear paths.

* * * * *